US011294190B2

(12) United States Patent
Min

(10) Patent No.: US 11,294,190 B2
(45) Date of Patent: *Apr. 5, 2022

(54) VIRTUAL REALITY CELL PHONE

(71) Applicant: Sang Kyu Min, Seoul (KR)

(72) Inventor: Sang Kyu Min, Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/904,979

(22) Filed: Jun. 18, 2020

(65) Prior Publication Data

US 2020/0319469 A1 Oct. 8, 2020

Related U.S. Application Data

(63) Continuation of application No. 16/096,416, filed as application No. PCT/KR2017/004466 on Apr. 26, 2017, now Pat. No. 10,725,306.

(30) Foreign Application Priority Data

| Apr. 28, 2016 | (KR) | ......................... 10-2016-0052245 |
| May 12, 2016 | (KR) | ......................... 10-2016-0058311 |
| May 12, 2016 | (KR) | ......................... 10-2016-0058341 |

(51) Int. Cl.
*G09G 5/00* (2006.01)
*G02B 27/01* (2006.01)
(Continued)

(52) U.S. Cl.
CPC ....... *G02B 27/0176* (2013.01); *G02B 27/017* (2013.01); *G06F 1/163* (2013.01);
(Continued)

(58) Field of Classification Search
CPC ......... G06F 1/1616; G06F 2203/04805; G06F 3/013; G06F 1/1613; G06F 1/1618;
(Continued)

(56) References Cited

U.S. PATENT DOCUMENTS

| 1,221,836 A | * | 4/1917 | Couden | .................. G02B 30/37 |
| | | | | 359/476 |
| 9,405,123 B2 | * | 8/2016 | Watanabe | .......... G02B 27/0922 |

(Continued)

FOREIGN PATENT DOCUMENTS

| JP | 2009-543619 A | 12/2009 |
| KR | 10-2013-0072315 A | 7/2013 |

(Continued)

OTHER PUBLICATIONS

International Search Report dated Aug. 24, 2017 in corresponding International application No. PCT/KR2017/004466; 4 pages.
(Continued)

*Primary Examiner* — Duc Q Dinh
(74) *Attorney, Agent, or Firm* — Maier & Maier, PLLC

(57) ABSTRACT

A virtual reality cell phone includes: a main body including a display; an ocular plate configured to maintain a variable distance from the rear surface of the main body; and a screen and distance adjustment member interposed between the main body and the ocular plate, and configured to move the ocular plate between a retracted state in which the ocular plate comes into close contact with the main body and an extended state in which the ocular plate maintains a predetermined distance from the main body. The screen and distance adjustment member includes a plurality of screen boxes configured to slide backward and be fixed while being laid over each other.

4 Claims, 20 Drawing Sheets

(51) Int. Cl.
*H04M 1/02* (2006.01)
*H04M 1/04* (2006.01)
*H04M 1/21* (2006.01)
*G06F 3/01* (2006.01)
*G06F 1/16* (2006.01)
*G06T 19/00* (2011.01)

(52) U.S. Cl.
CPC .............. *G06F 3/011* (2013.01); *G06F 3/012* (2013.01); *G06T 19/006* (2013.01); *H04M 1/0254* (2013.01); *H04M 1/04* (2013.01); *H04M 1/21* (2013.01); *G02B 2027/0178* (2013.01)

(58) Field of Classification Search
CPC ...... G06F 1/1652; G06F 1/1677; G06F 3/012; H04N 5/2253; H04N 5/2254; H04N 5/2257; H04N 13/344; H04N 13/383; H04N 5/7491; G02B 2027/0136; G02B 2027/0178; G02B 27/017; G02B 27/0176; G02B 27/04; G02B 7/22; G02B 6/0016; G02B 6/003; G02B 27/01; G02B 30/37; G02B 6/0065; G02B 6/0076; G02B 6/0058; H04M 1/0254; H04M 1/04; H04M 1/21; G02C 11/10; G09G 5/003
USPC ........................................................ 345/7–9
See application file for complete search history.

(56) References Cited

U.S. PATENT DOCUMENTS

| | | | |
|---|---|---|---|
| 2015/0241708 A1* | 8/2015 | Watanabe | G11B 27/11 386/230 |
| 2015/0302651 A1 | 10/2015 | Shpigelman | |
| 2016/0041682 A1* | 2/2016 | Nishibori | G06F 3/0487 345/173 |
| 2016/0062125 A1 | 3/2016 | Baek et al. | |
| 2016/0253006 A1* | 9/2016 | Lyons | G02B 7/023 345/174 |
| 2016/0299569 A1* | 10/2016 | Fisher | G02B 27/0172 |
| 2017/0219797 A1* | 8/2017 | Duan | G02B 7/22 |
| 2017/0318281 A1* | 11/2017 | Edlund | G03B 35/18 |

FOREIGN PATENT DOCUMENTS

| | | |
|---|---|---|
| KR | 10-2014-0078237 A | 6/2014 |
| KR | 10-2015-0027651 A | 3/2015 |
| KR | 10-1579130 B1 | 12/2015 |
| KR | 10-2016-0024168 A | 3/2016 |
| KR | 10-2016-0026429 A | 3/2016 |
| KR | 10-1616966 B1 | 4/2016 |
| WO | 2015/025511 A1 | 2/2015 |

OTHER PUBLICATIONS zdnet.co.kr; ZDNet Korea news print; [online] URL; http://www.zdnet.co.kr/news/news_view.asp?artice_id=20130104095402; Jan. 4, 2013; search on Oct. 22, 2018; 3 pages.

* cited by examiner

VIRTUAL REALITY CELL PHONE

TECHNICAL FIELD

The present invention relates to a virtual reality cell phone, and more specifically to a cell phone by which a module configured to enable virtual reality to be experienced is provided in an integrated form.

BACKGROUND ART

Virtual reality is a human-computer interface that artificially creates a specific environment or situation and enables a human, who is using virtual reality, to feel as if he or she were interacting with an actual surrounding situation or an actual environment. The term virtual reality is used interchangeably with the terms artificial reality, cyberspace, virtual worlds, virtual environment, synthetic environment, and artificial environment.

The purpose of use of virtual reality is to enable a human to view and manipulate an environment that is difficult to experience in an everyday situation without directly experiencing it as if he or she were present in the environment. Application fields of virtual reality include education, remote manipulation, remote satellite surface exploration, exploration data analysis, and scientific visualization.

Recently, as smartphones have become popularized, virtual reality has attracted attention again. Representative examples of virtual reality include Gear VR, which was manufactured by Samsung in association with Oculus, LG's "G3 VR," and Google's Cardboard. These products can interact with smartphones to thus enable virtual reality to be experienced, and the prices thereof are cheaper than those of existing VR devices.

DISCLOSURE

The present invention provides a cell phone in which a virtual reality function is included.

The present invention provides a cell phone that does not require a separate device to be carried and that can immediately implement a virtual reality (VR) function at a desired time and a desired location.

According to an exemplary embodiment of the present invention, there is provided a virtual reality cell phone including: a main body including a main display on the front surface thereof and a virtual reality display on the rear surface thereof; an ocular plate configured to maintain a variable distance from the rear surface of the main body; and a screen and distance adjustment member interposed between the main body and the ocular plate, and configured to move the ocular plate between a retracted state in which the ocular plate comes into close contact with the main body and an extended state in which the ocular plate maintains a predetermined distance from the main body; wherein the screen and distance adjustment member includes a plurality of screen boxes configured to slide backward and be fixed while being laid over each other.

According to another embodiment of the present invention, there is provided a virtual reality cell phone including: a main body including a display on the front surface thereof; a main frame configured to accommodate the main body in an invertible manner; an ocular plate configured to maintain a variable distance from the rear surface of the main frame; and a screen and distance adjustment member interposed between the main frame and the ocular plate, and configured to move the ocular plate between in a retracted state in which the ocular plate comes into close contact with the main frame and an extended state in which the ocular plate maintains a predetermined distance from the main frame; wherein when the ocular plate is in the extended state, a virtual reality function can be implemented by orienting the display of the inverted main body backward.

The virtual reality cell phone according to the present invention is configured such that a common cell phone and a virtual reality module are integrated with each other and are coupled to each other in a portable structure, so that the virtual reality cell phone has no inferiority as a common cell phone and can implement a virtual reality function regardless of location and time.

Although the utilization of virtual reality is increased as the number of functions that can be implemented by a virtual reality function increases, it does not satisfy such needs if it is necessary to carry a separate auxiliary device as in the conventional technology.

Accordingly, a structure in which the ocular plate can be maintained at a variable distance from the cell phone may be formed by using the screen and distance adjustment member. The screen and distance adjustment member may include a plurality of screen boxes configured to slide backward and be fixed while being laid over each other and, thus, may also implement the light blocking screen function of preventing external light from entering.

Furthermore, since the main body is mounted inside the main frame in an invertible manner, the main body may be normally used for a general purpose, and then the main body may be inverted and directed backward in order to perform a virtual reality function. For reference, in the present specification, the main frame does not need to accommodate all the side surfaces of the main body, and may be provided in a structure in which the main frame accommodates three surfaces or only two surfaces adjacent to a rotating axis.

The virtual reality function using the virtual reality display and the ocular plate may be implemented using various methods. For example, although a virtual reality display may be divided into left and right parts and a three-dimensional effect may be implemented using a pair of ocular lenses, as in the conventional cardboard, a polarizing glasses method in which polarizing lenses are mounted on an ocular plate, a shutter glasses method in which left and right ocular lenses are opened and closed in an ocular plate at time intervals, etc. may be also applied to the present invention. Additionally, various types of combinations of a display and lenses for the implementation of virtual reality or three-dimensional display may be implemented.

The ocular plate needs to maintain a retracted state in which the ocular plate comes into close contact with the main body while a virtual reality function is not used, and needs to maintain an extended state in which the ocular plate is spaced apart from the main body by a predetermined distance while a virtual reality function is used. For this purpose, the ocular plate needs to form a variable distance without being fastened to the main body. For this purpose, the mutual friction and fastening force of screen boxes or a bellows method are applied to the screen and distance adjustment member, or a link structure is applied to the distance adjustment member, thereby moving an ocular plate between the retracted state and the extended state.

For example, the screen and distance adjustment member may be implemented using a plurality of screen boxes. The extended state between the display of the inverted main body and the ocular plate can be maintained using the mutual friction and fastening force of the screen boxes, and external light can be blocked. Alternatively, the screen and distance adjustment member may separately include: a distance adjustment member interposed between the main frame and the ocular plate and configured to move the ocular plate between the retracted state and the extended state; and a light blocking screen interposed between the main frame and the ocular plate and configured to prevent external light from entering in the extended state of the ocular plate.

Furthermore, the ocular plate needs to form a variable distance in order to enable fine adjustment. The reason for this is that adjustment is required because humans differ in biological characteristics, such as visual acuity, the distance between the eyes, the shape of the eyes, etc. For this purpose, although a method of moving lenses in a front-back direction may be used, it may be possible to construct a screen and distance adjustment member in various manners and to move the ocular plate between the retracted state and the extended state.

Furthermore, the distance adjustment member may be provided so that fine distance adjustment can be performed when necessary and the angle of the ocular display and the misalignment of the display with a vertical axis can be also adjusted independently.

The light blocking screen is intended to prevent external light from entering in the extended state of the ocular plate. Although both ends of the screen may be fastened to the main body and the ocular plate, respectively, the screen may be fastened to any one side and may be then fastened to the other side additionally in the extended state.

The material of the light blocking screen may be also selected from among various materials. For example, a fiber material having excellent elasticity may be used. The light blocking screen may be provided in a bellows shape.

When the screen and distance adjustment member is implemented using screen boxes, the screen boxes may be each formed in a single-wall structure, or may be each provided in a double-wall structure in order to provide a firm support structure and a reduction in weight. In other words, in order to implement the double-wall structure, each of the screen boxes may include an inner wall and an outer wall, and a minimum space may be formed between the inner and outer walls.

Furthermore, in order to deal with heat or electromagnetic waves generated from the virtual reality display, vents may be formed in the screen boxes. However, light may enter directly from the outside through the vents. Accordingly, in each of the screen boxes having a double-wall structure, a first vent is formed in the inner wall thereof, a second vent is formed in the outer wall thereof, and the first and second vents are formed not to overlap each other, i.e., in a non-overlap manner, thereby preventing light from entering directly from the outside.

Since it is sufficient if the screen and distance adjustment member effectively blocks external light in order to increase an immersion level, the screen and distance adjustment member may completely block a space between the main body and the ocular plate, or may partially open the space as long as its intrinsic function is not damaged.

Furthermore, in order to implement a virtual reality function in a more realistic fashion, fastening members configured to fasten the cell phone in its extended state to the face of a user may be further included. The fastening members may be provided in various forms, such as the earloops of a common mask, the temples of glasses, a helmet mount, an elasticity band, etc.

The virtual reality cell phone according to the present invention may further include a rear cover configured to selectively open and close the rear surfaces of the ocular plate and the main body in the retracted state of the ocular plate. The rear cover is used for the purpose of protecting the ocular plate, and may further include a smell generation unit configured to generate a specific smell in connection with the content of virtual reality or a wind generation unit configured to generate a wind in connection with the content of virtual reality.

The virtual reality cell phone according to the present invention is configured such that a common cell phone and a virtual reality module are integrated with each other and are coupled to each other in a portable structure, so that the virtual reality cell phone has no inferiority as a common cell phone and can implement a virtual reality function regardless of location and time. The number of functions that can be implemented by a virtual reality function can increase, and also it is not necessary to carry a separate auxiliary device, unlike in the conventional technology, thereby improving the convenience of a user.

Furthermore, the main body is mounted inside the main frame in an invertible manner, so that a single display can be used both as a general monitor and as a virtual reality monitor.

Moreover, a structure in which the ocular plate is maintained at a variable distance from the cell phone can be constructed by the screen and distance adjustment member and also the light blocking screen function of preventing external light from entering can be implemented by the same structure, so that an overall structure can be simplified and both high-quality sliding movement and firmness can be acquired.

These features can be made to produce further improved effects by forming the screen boxes in double-wall structures, and the convenience of a user can be further increased by forming the vents in a non-overlap manner and also providing the lightweight structures.

BRIEF DESCRIPTION OF DRAWINGS

FIG. 5(*b*) is a partially enlarged sectional view illustrating the screen and distance adjustment member of the virtual reality cell phone according to the embodiment of the present invention;

DETAILED DESCRIPTION

Although preferred embodiments of the present invention will be described in detail below with reference to the accompanying drawings, the present invention is not limited or restricted by the embodiments. For reference, in the present description, the same reference symbols refer to substantially the same components. Under this rule, items shown in other drawings may be described through citation. A description determined to be apparent to those skilled in the art or repeated description may be omitted.

A first embodiment of the present invention will be described with reference to FIGS. 1 to 8.

Figure 1:
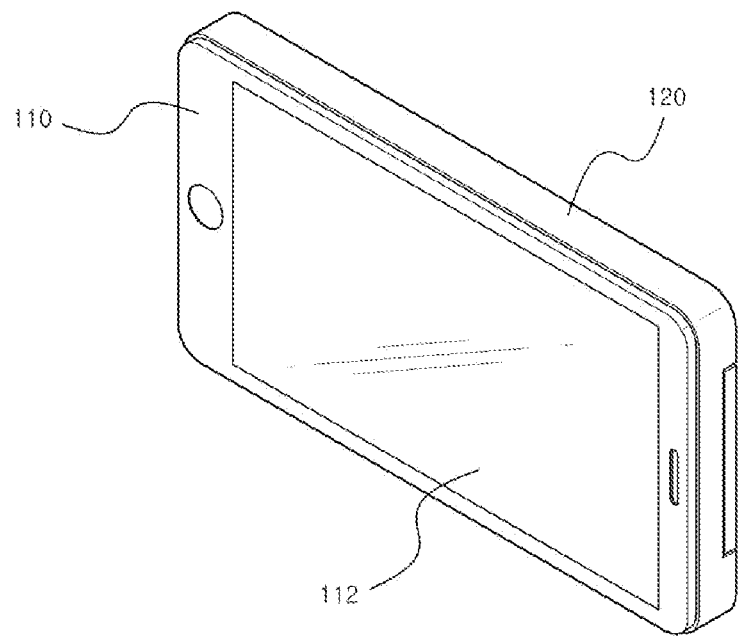
FIG. 1 is a perspective view of a virtual reality cell phone according to an embodiment of the present invention.
Figure 2:
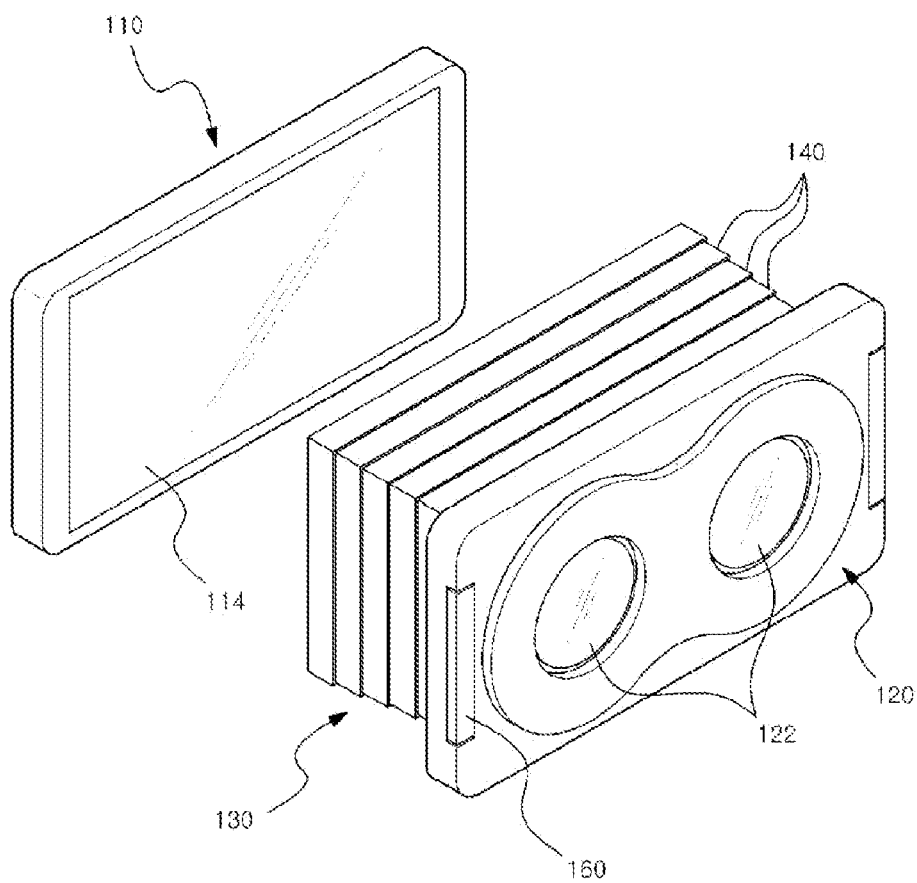
FIG. 2 is an exploded perspective view showing the virtual reality cell phone of FIG. 1 from the rear surface thereof.
Figure 3:
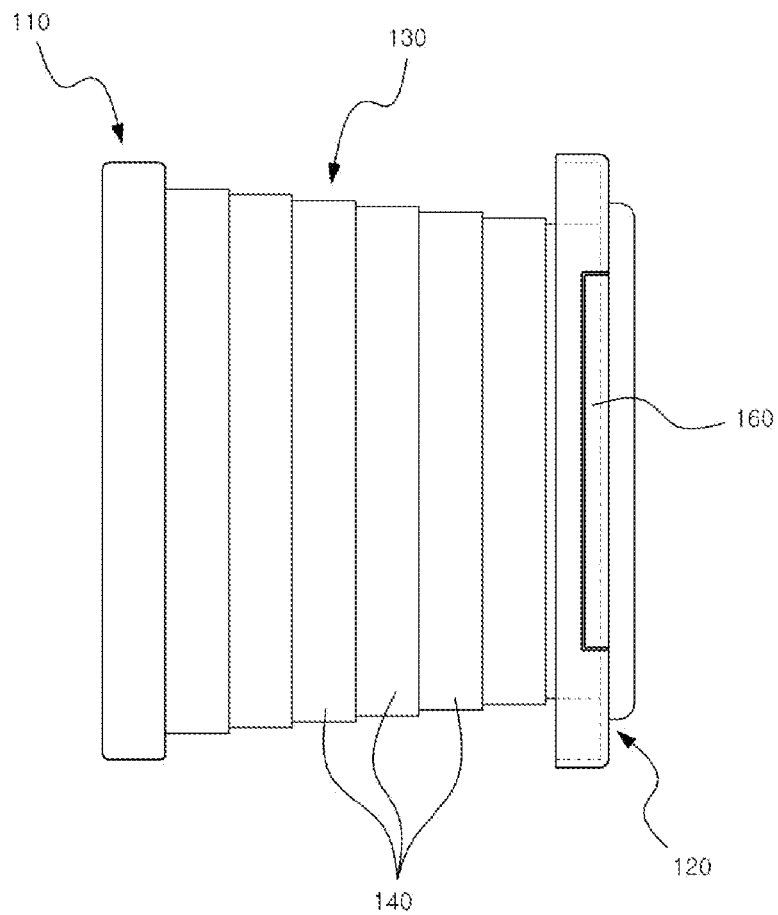
FIG. 3 is a side view of the virtual reality cell phone of FIG. 1.

Referring to FIGS. 1 to 3, a virtual reality cell phone 100 according to the present embodiment includes a main body 110, an ocular plate 120, and a screen and distance adjustment member 130.

The main body 110 includes a main display 112 disposed on the front surface thereof and a virtual reality display 114 disposed on the rear surface thereof, and may perform the making of a basic call, the running of an application, etc. through the manipulation of the front main display 112 or another button, or the like. Furthermore, the back virtual reality display 114 may provide a virtual reality function to a user in conjunction with the ocular plate 120. The virtual reality display 114 may be operated through the manipulation of a user, the movement detection of the ocular plate 120, or the like.

The ocular plate 120 includes a pair of ocular lenses 122, and a user can view an image, displayed on the virtual reality display 114, via the ocular lenses 122. The ocular lenses 122 allow their focus to be adjusted through fine rotational manipulation, and also allow their lateral interval to be adjusted in accordance with the distance between the eyes. Additionally, a cushion corresponding to the shape of a face, a light blocking structure configured to additionally block light, or the like may be added around the ocular lenses 122.

A flange configured to partially cover the side surfaces of the main body 110 may be further included outside the ocular plate 120. The flange can protect internal parts, can prevent dust from entering, and enables the ocular plate 120 to solidly and firmly maintain its shape by blocking the outside of the ocular plate 120.

The screen and distance adjustment member 130 includes a plurality of screen boxes 140 configured to slide and be fixed in a longitudinal direction while being laid over each other. The screen boxes 140 may be formed in rectangular shapes corresponding to the shape of the cell phone, in elliptical shapes, or in shapes each having an 8-shaped appearance conforming to the shape of the eyes.

In the screen and distance adjustment member 130, the screen boxes 140 slide while undergoing friction, like a metal antenna, and thus they may be stopped at desired locations and may maintain a variable distance. Furthermore, the screen boxes 140 can block four sides from the outside, and, thus, can effectively block external light.

In the present embodiment, one of the screen boxes 140 that are fastened to the main body 110 is mounted on or in the rear surface, side surfaces, or inside of the main body 110. The location and structure at and in which the screen box 140 is mounted may vary in various manners so that an overall thickness can be reduced in a retracted state.

Figure 4:
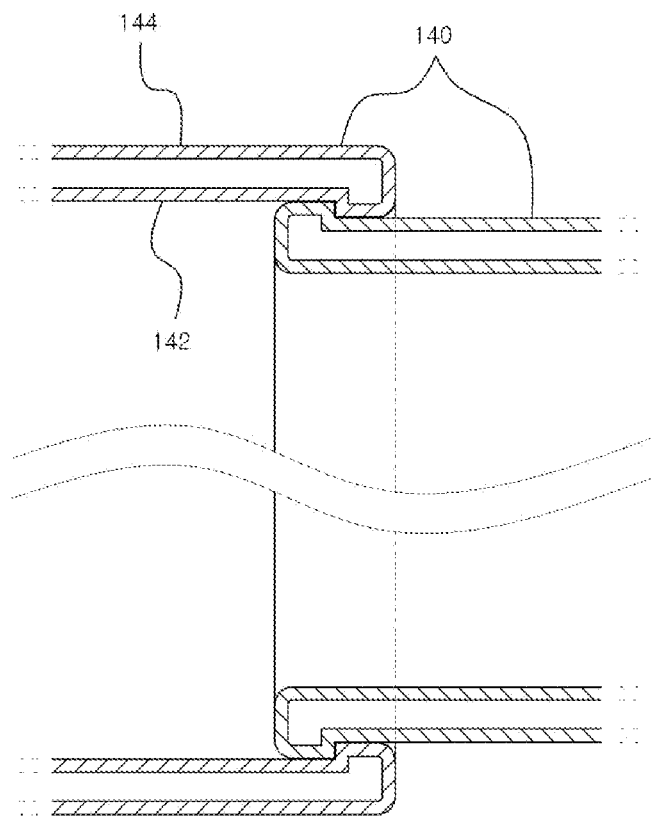
FIG. 4 is a sectional view illustrating the screen and distance adjustment member of a virtual reality cell phone according to the embodiment of the present invention.

FIG. 4 is a sectional view illustrating the screen and distance adjustment member of the virtual reality cell phone according to the embodiment of the present invention.

Referring to FIG. 4, the screen boxes 140 constituting the screen and distance adjustment member 130 may be each formed in a double-wall structure. Each of the screen boxes 140 having a double-wall structure includes an inner wall 142 and an outer wall 144, and the inner wall 142 and the outer wall 144 may maintain a distance over an overall or partial area. The screen boxes 140 each have a double-wall structure, and thus have a considerably lower weight for the same thickness than screen boxes each having a single-wall structure, and also the screen boxes 140 can form a firm structure.

FIG. 5 is a partially enlarged sectional view illustrating the screen and distance adjustment member of the virtual reality cell phone according to the embodiment of the present invention.

Figure 5A:
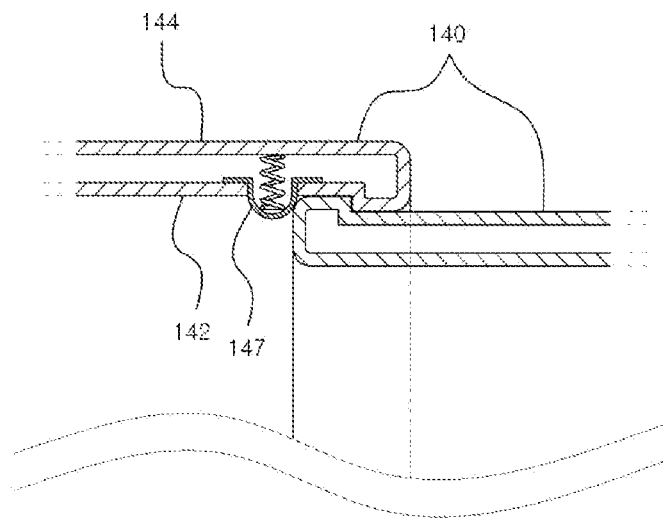
FIG. 5(*a*) is a partially enlarged sectional view illustrating the screen and distance adjustment member of the virtual reality cell phone according to the embodiment of the present invention.

Referring to FIG. 5(a), each of the screen boxes 140 may further include an elastic protrusion 147 protruding from the inner wall of the screen box 140 in order to maintain a retracted state or extended state. In the extended state in which the screen boxes 140 have been extended, the elastic protrusion 147 supports an end of another screen box 140, thereby fastening the screen boxes 140 in order to prevent the screen boxes 140 from being laid over each other under force equal to or lower than predetermined force.

Figure 5B:
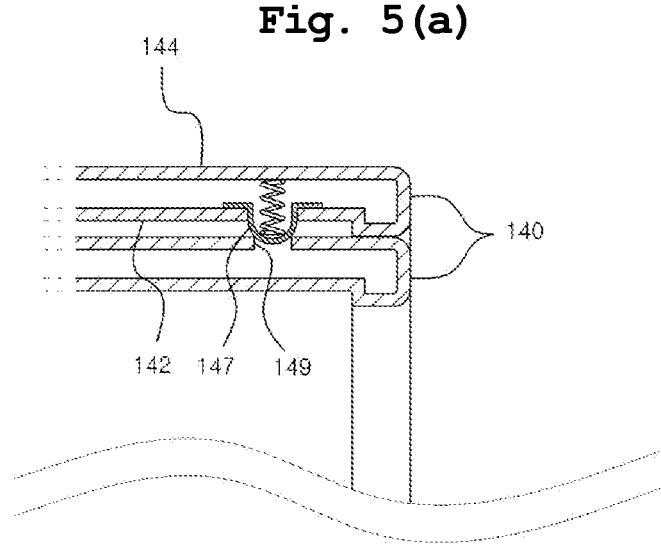

Furthermore, referring to FIG. 5(b), in the retracted state in which the screen boxes 140 have been laid over each other, the elastic protrusion 147 is stuck in a protrusion reception hole 149 formed in another screen box 140, thereby fastening the screen boxes 140 in order to prevent the screen boxes 140 from sliding into each other also under force equal to or lower than predetermined force.

Although the elastic protrusion 147 is formed in a structure in which the elastic protrusion 147 protrudes from the inner wall 142 of the screen box 140 in the present embodiment, the elastic protrusion 147 may be formed in a structure in which the elastic protrusion 147 protrudes from the outer wall or both from the inner wall and from the outer wall. The elastic protrusions 147 may be designed to be spaced apart from each other in a direction perpendicular to extension and retraction directions so as not to interfere with mutual operation. Furthermore, the elastic protrusions 147 may be elastically supported by their own elasticity, as in the case of leaf springs, rather than being supported by springs.

Figure 6:
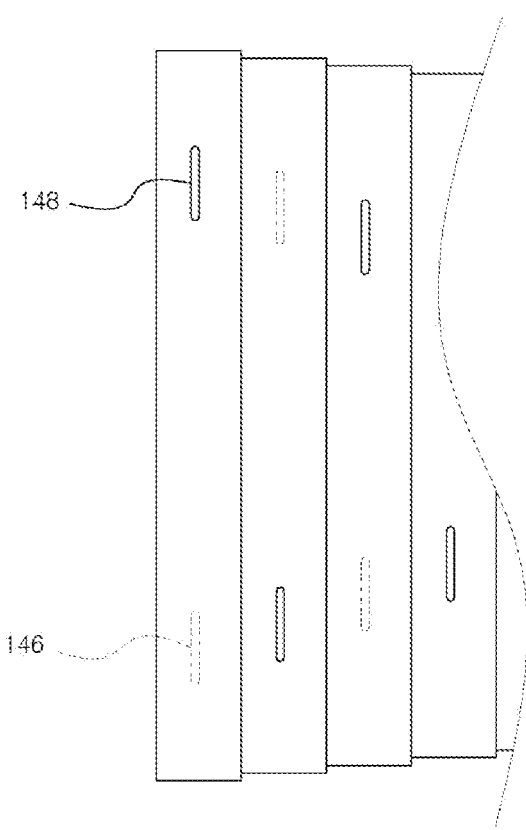
FIG. 6 is a partially enlarged side view illustrating the screen and distance adjustment member of the virtual reality cell phone according to the embodiment of the present invention.

FIG. 6 is a partially enlarged side view illustrating the screen and distance adjustment member of the virtual reality cell phone according to the embodiment of the present invention.

Referring to FIG. 6, the screen boxes 140 of the screen and distance adjustment member 130 may be each formed in a double-wall structure, as illustrated in FIG. 4. When the screen boxes 140 of the screen and distance adjustment member 130 are each formed in a double-wall structure, a reduction in weight can not only be implemented, but other effects can be also achieved. For example, when vents are formed in the screen and distance adjustment member 130, each first vent 146 and a corresponding second vent 148 are formed not to overlap each other, thereby preventing light from entering from the outside.

More specifically, in each of the screen boxes 140 having a double-wall structure, a first vent 146 is formed in an inner wall 142 and a second vent 148 is formed in an outer wall 144 so that the first vent 146 and the second vent 148 do not overlap each other, i.e., in a non-overlap manner, as shown the drawing, thereby preventing light from entering from the outside.

Referring back to FIGS. 2 and 3, the screen and distance adjustment member 130 is interposed between the main body 110 and the ocular plate 120. While the ocular plate 120 remains in an extended state, external light can be prevented from entering.

In the present embodiment, the sizes of the screen boxes 140 decrease gradually. The sizes may increase and then decrease in a front-back direction. Conversely, the sizes of the screen boxes may increase gradually. Alternatively, the sizes of the screen boxes may increase and then decrease. The opposite case is also possible.

Furthermore, although the screen boxes 140 preferably block external light on four sides in order to increase an immersion level, they may be allowed to partially block a space between the main body 110 and the ocular plate 120 as long as the immersion level is not seriously degraded even when the space is partially opened.

Figure 7:
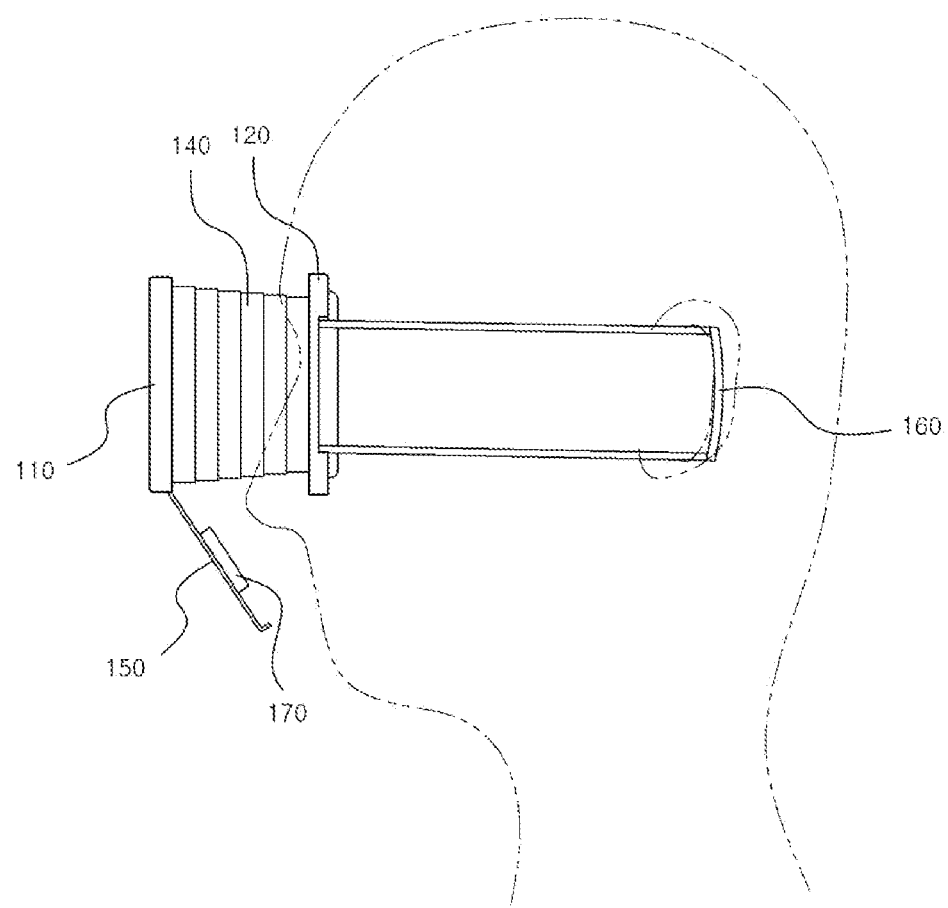
FIG. 7 is a side view illustrating a virtual reality cell phone according to an embodiment of the present embodiment.

FIG. 7 is a side view illustrating a virtual reality cell phone according to the present embodiment.

Referring to FIG. 7, the virtual reality cell phone may include a main body 110, an ocular plate 120, and a screen and distance adjustment member 130 like the previous embodiment, and may further include a rear cover 150.

The rear cover 150 may be used for the purpose of protecting the ocular plate 120. While a user is wearing the virtual reality cell phone, the rear cover 150 may be used in the state of drooping from the bottom surface of the main body 110 or ocular plate 120.

When the rear cover 150 is formed on the main body 110, the ocular plate 120 can not only be protected, but a smell generation unit configured to generate a specific smell in connection with the content of virtual reality or a wind generation unit 170 configured to generate a wind in connection with the content of virtual reality may be also formed additionally.

Furthermore, in order to implement a virtual reality function in a more realistic fashion, fastening members 160 configured to fasten the cell phone in its extended state to the face of a user may be further included. The fastening members 160 may be provided in the form of the earloops of a common mask. The fastening members 160 may be normally prepared on both sides of the ocular plate 120, and may be spread backward and fitted around the ears of a user for the convenience of the user. Alternatively, it will be apparent that the fastening members 160 may be formed on the main body 110.

The fastening members 160 may be provided in the form of the temples of glasses, or may be provided in the form of an elastic band that is fastened to the head of a user.

Figure 8A:
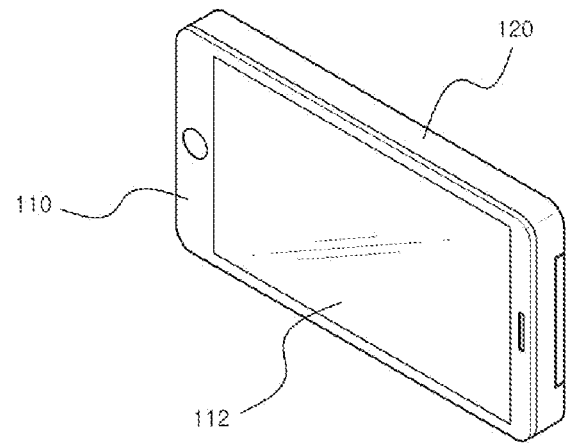
FIG. 8(*a*) is a perspective view illustrating a virtual Reality cell phone according to another embodiment of the present invention.
FIG. 8(b) is a perspective view illustrating a virtual reality cell phone according to another embodiment of the present invention.
Figure 8B:
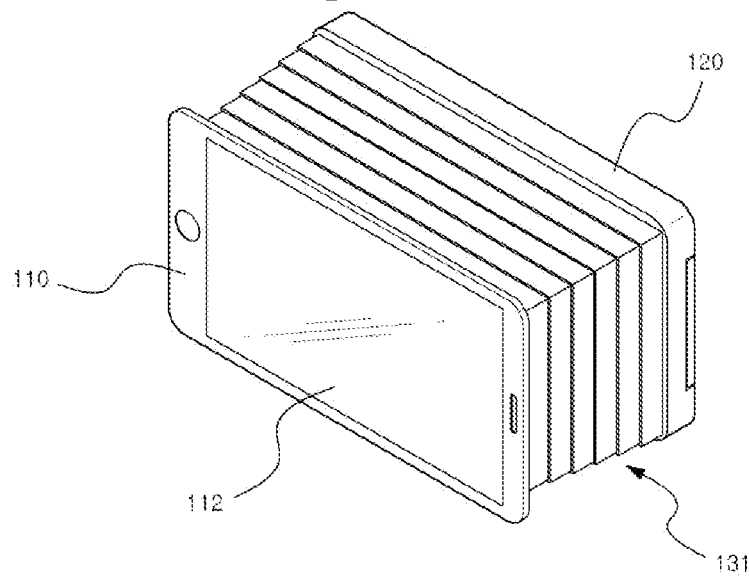

Referring to FIG. 8, a virtual reality cell phone according to the present embodiment includes a main body 110, an ocular plate 120, and a screen and distance adjustment member 131. For detailed descriptions of these components, reference may be made to the description of the previous embodiment.

In contrast, in the present embodiment, the screen and distance adjustment member 131 may accommodate the side surfaces of the main body 110, may be extended backward from the side surfaces of the main body 110 and space the ocular plate 120 apart from the main body 110 by a predetermined distance, and may prevent light from entering between the main body 110 and the ocular plate 120.

In this case, screen boxes 140 constituting the screen and distance adjustment member 131 may be each formed in a single-wall or double-wall structure, and may gradually increase in size and be connected to each other from the main body 110.

The ocular plate 120 is mounted at the rear end of the screen and distance adjustment member 131, in which case a substantially blocked space may be also formed between the main body 110 and the ocular plate 120 through the extension of the screen boxes 140.

A second embodiment of the present invention will be described with reference to FIGS. 9 to 12.

Figure 9:
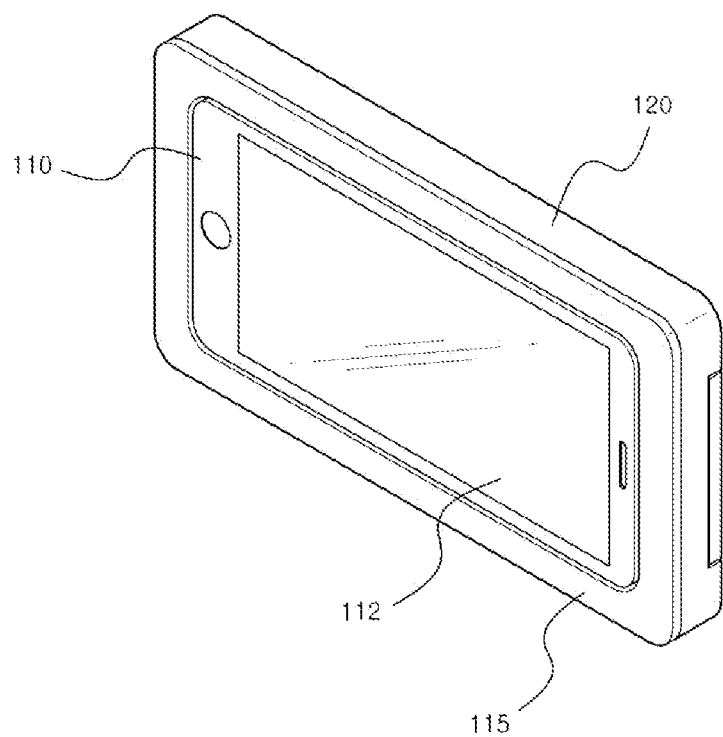
FIG. 9 is a perspective view of a virtual reality cell phone according to an embodiment of the present invention.
Figure 10:
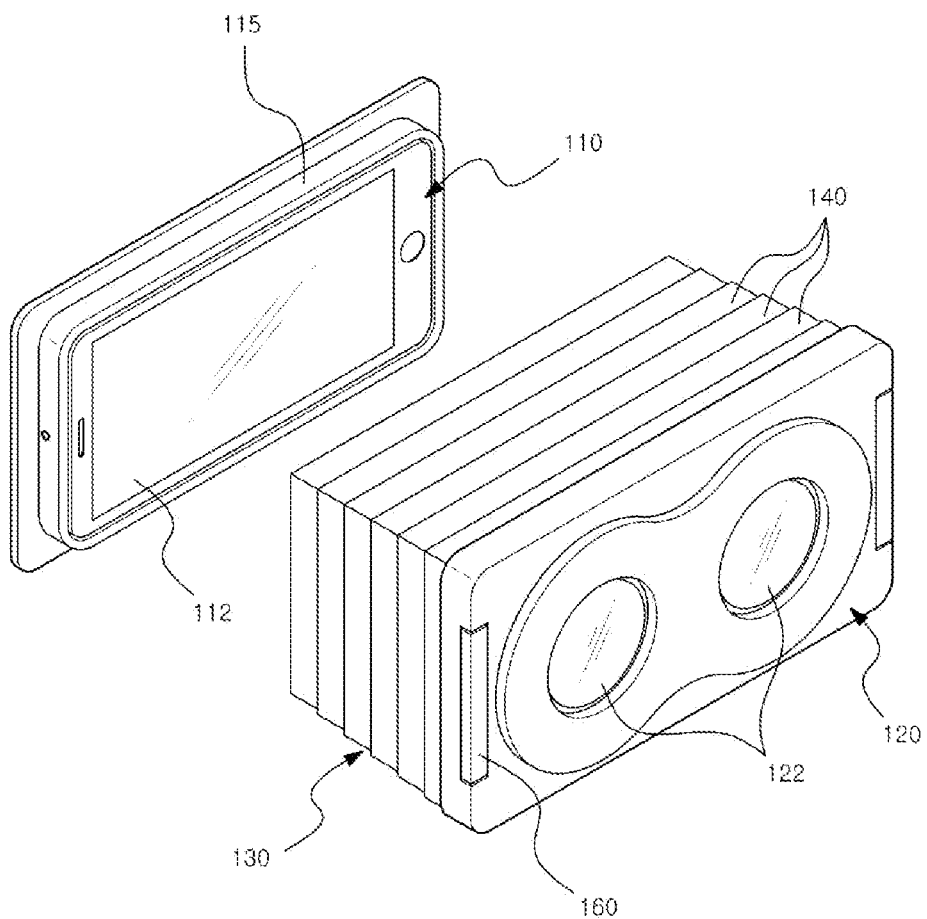
FIG. 10 is an exploded perspective view showing the virtual reality cell phone of FIG. 9 from the rear surface thereof.
Figure 11:
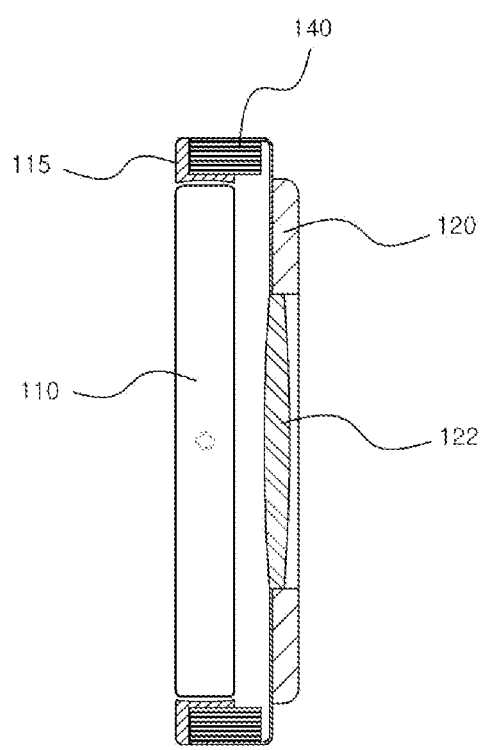
FIG. 11 is a sectional view of the virtual reality cell phone of FIG. 9 in a retracted state.
Figure 12:
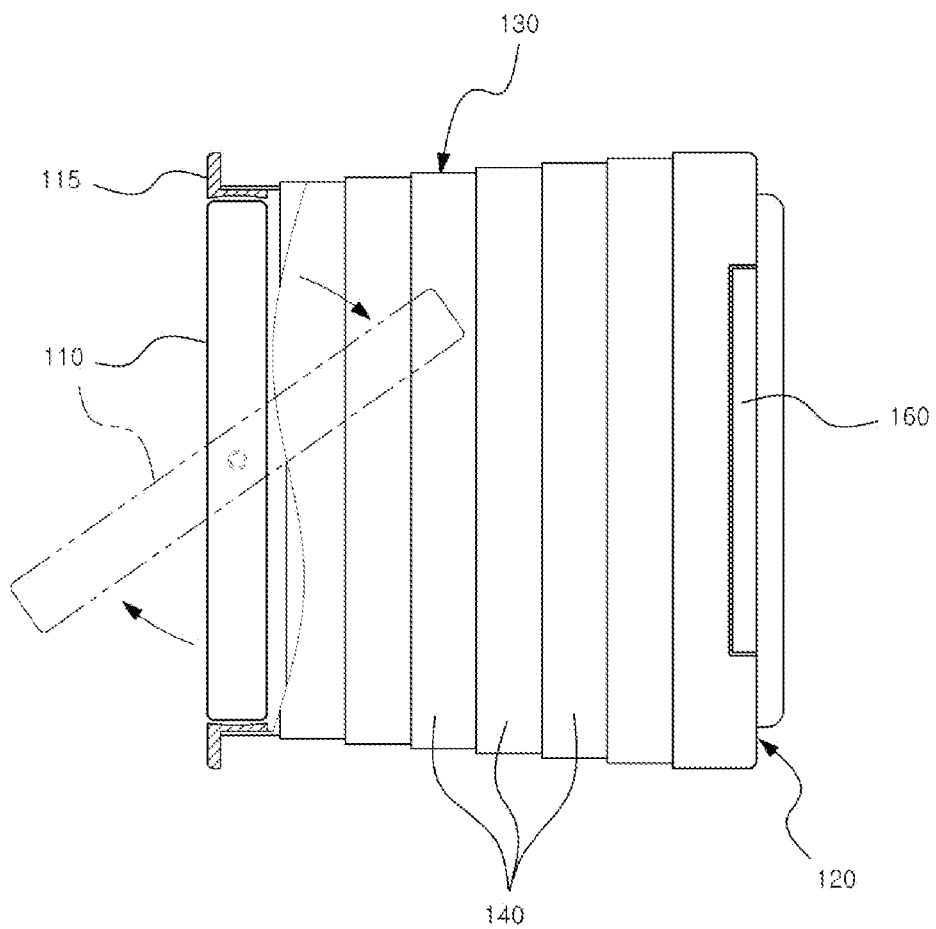
FIG. 12 is a sectional view of the virtual reality cell phone of FIG. 9 in an extended state.

FIG. 9 is a perspective view of a virtual reality cell phone according to the second embodiment of the present invention, FIG. 10 is an exploded perspective view showing the virtual reality cell phone of FIG. 9 from the rear surface thereof, FIG. 11 is a sectional view of the virtual reality cell phone of FIG. 9 in a retracted state, and FIG. 12 is a sectional view of the virtual reality cell phone of FIG. 9 in an extended state.

Referring to FIGS. 9 to 12, the virtual reality cell phone 100 according to the second embodiment of the present invention includes a main body 110, a main frame 115, an ocular plate 120, and a screen and distance adjustment member 130.

The main body 110 includes a main display 112 disposed on the front surface thereof, and may perform the making of a basic call, the running of an application, etc. through the manipulation of the main display 112 or another button, or the like.

The main body 110 may be rotatably mounted within the main frame 115. According to the rotation of the main body 110, the display 112 may be fastened in the state of being oriented forward or in the state of being oriented rearward.

The orientation of the display 112 may be detected through the rotational state of the main body 110. A virtual reality function may be automatically operated through the manipulation of a user, the orientation of the main body 110, the detection of the movement of the ocular plate 120, or the like.

The ocular plate 120 includes a pair of ocular lenses 122. A user may view an image, displayed on the inverted display 112, via the ocular lenses 122.

The screen and distance adjustment member 130 is mounted on the rear surface of the main frame 115, and may include a plurality of screen boxes 140 configured to slide and be fixed in a longitudinal direction while being laid over each other. The screen boxes 140 may be formed in rectangular shapes corresponding to the shape of the cell phone, in elliptical shapes, or in shapes each having an 8-shaped appearance conforming to the shape of the eyes.

A third embodiment of the present invention will be described with reference to FIGS. 13 to 16.

Figure 13:
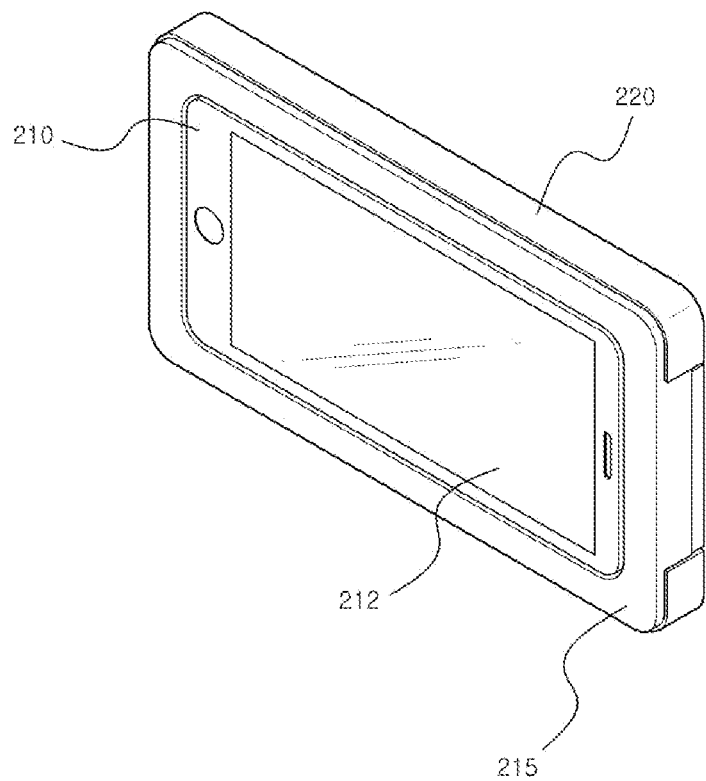
FIG. 13 is a perspective view of a virtual reality cell phone according to a third embodiment of the present invention.
Figure 14:
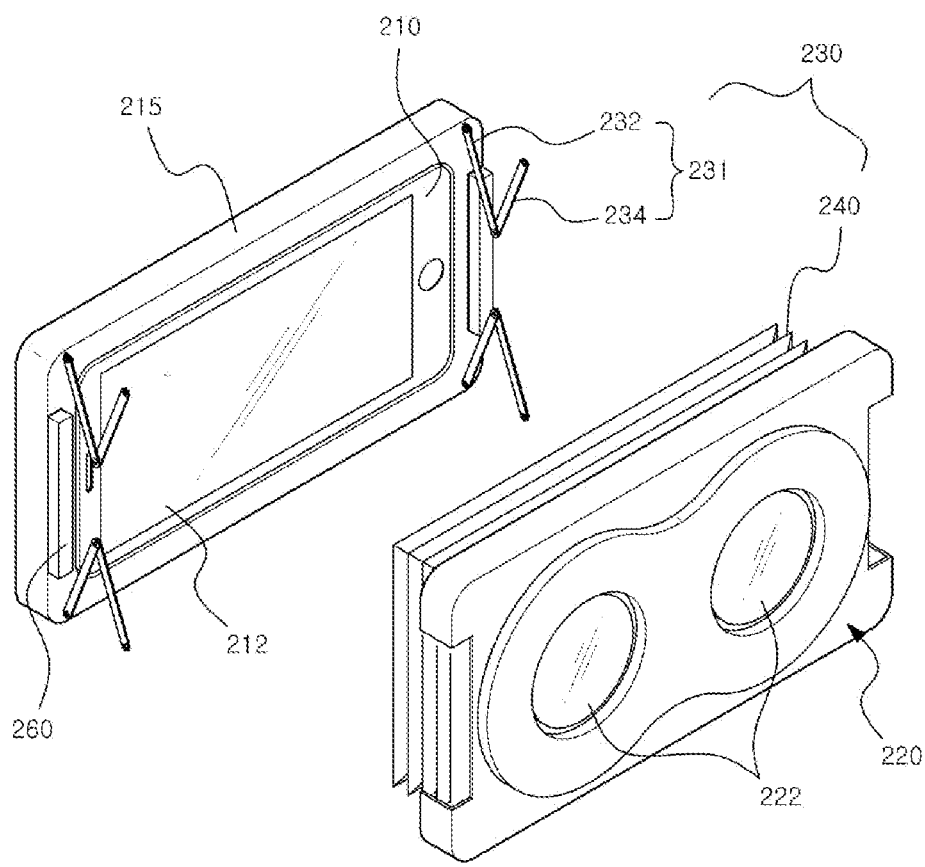
FIG. 14 is an exploded perspective view showing the virtual reality cell phone of FIG. 13 from the rear surface thereof.
Figure 15:
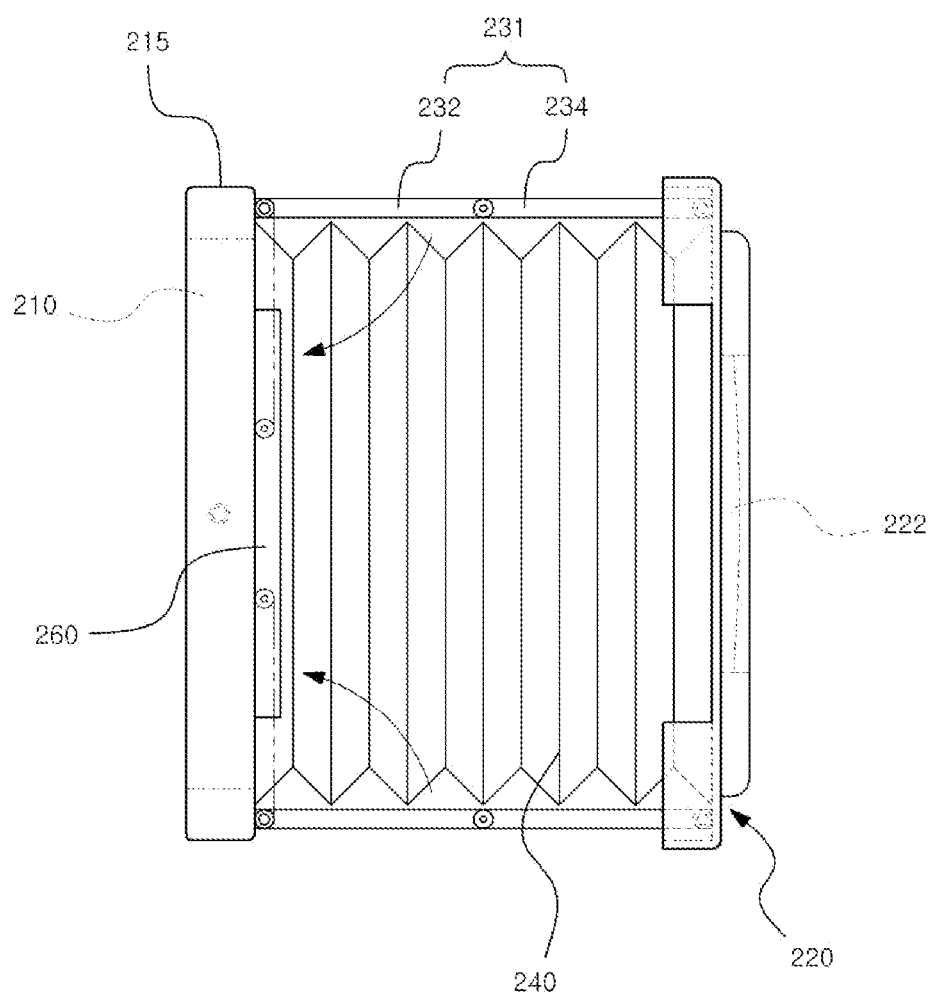
FIG. 15 is a side view of the virtual reality cell phone of FIG. 13.

FIG. 13 is a perspective view of a virtual reality cell phone according to the third embodiment of the present invention, FIG. 14 is an exploded perspective view showing the virtual reality cell phone of FIG. 13 from the rear surface thereof, and FIG. 15 is a side view of the virtual reality cell phone of FIG. 13.

Referring to FIGS. 13 to 15, the virtual reality cell phone 200 according to the present embodiment includes a main body 210, a main frame 215, an ocular plate 220, and a screen and distance adjustment member 230.

The main body 210 includes a main display 212 disposed on the front surface thereof, and may perform the making of a basic call, the running of an application, etc. through the manipulation of the main display 212 or another button, or the like.

The main body 210 includes a main display 212 disposed on the front surface thereof, and may be rotatably mounted within the main frame 215. The display 212 may be fastened in the state of being oriented forward or in the state of being oriented rearward.

The orientation of the display 212 may be detected through the rotational state of the main body 210. A virtual reality function may be automatically operated through the manipulation of a user, the orientation of the main body 210, the detection of the movement of the ocular plate 220, or the like.

The ocular plate 220 includes a pair of ocular lenses 222. A user may view an image, displayed on the inverted display 212, via the ocular lenses 222.

The screen and distance adjustment member 230 includes a distance adjustment member 231, and a light blocking screen 240. The distance adjustment member 231 includes first links 232 and second links 234 configured such that each of the first links 232 and a corresponding one of the second links 234 are connected to each other at their inner ends. The outer ends of the first links 232 are rotatably connected to the main frame 215, and the outer ends of the second links 234 are rotatably connected to the ocular plate 220.

Four combinations, each including a first link 232 and a second link 234, connect the ocular plate 220 to the four corners of the main frame 215. The first links 232 and the second links 234 move the ocular plate 220 between an extended state and a retracted state while being spread in rectilinear shapes or bent in V shapes.

Figure 16:
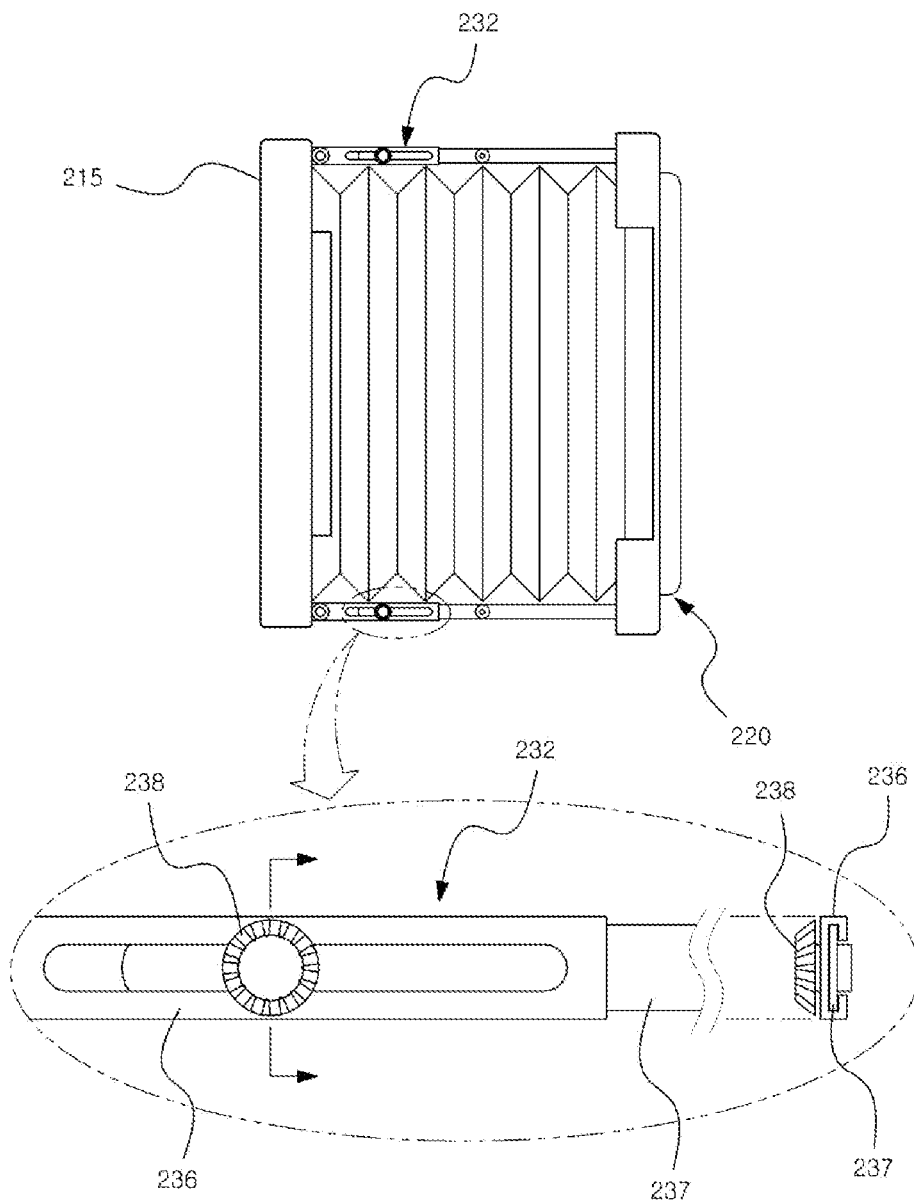
FIG. 16 is a partially enlarged view illustrating the distance adjustment member of a virtual reality cell phone according to an embodiment of the present invention.

FIG. 16 is a partially enlarged view illustrating the distance adjustment member of a virtual reality cell phone according to the present embodiment.

Referring to FIG. 16, a first link 232 may be provided to be adjusted and fixed in length. For this purpose, the first link 232 includes at least two rods 236 and 237 configured such that the overlapping length thereof can be adjusted. An elongated hole formed in a longitudinal direction is formed in at least one of the rods 236 and 237. A fine adjustment screw 238 is mounted in the elongated hole, and thus the overlapping length of the rods 236 and 237 can be adjusted and fixed.

Additionally, a plurality of stop protrusions may be formed on the elongated hole at predetermined intervals, and thus the overlapping length of the rods can be adjusted through movement between the stop protrusions.

Fine distance adjustment is enabled by adjusting the overlapping distance when necessary, as described above. The angle of the ocular display and the misalignment of the display with a vertical axis can be also adjusted by independently adjusting the four link combinations.

Referring back to FIGS. 13 and 14, the light blocking screen 240 is interposed between the main frame 215 and the ocular plate 220, and may prevent external light from entering while the ocular plate 220 is in an extended state.

In the present embodiment, the light blocking screen 240 is formed in a bellows shape. Both ends of the light blocking screen 240 are fastened to the main frame 215 and the ocular plate 220, respectively, and thus a substantially complete darkroom is formed. However, the light blocking screen 240 may be made of a material having excellent elasticity, rather than being formed in a bellows form. The light blocking screen 240 may be designed such that it is normally fastened to any one side and is then fastened to the other side in an extended state.

Furthermore, although the screen boxes 240 preferably block external light on four sides in order to increase an immersion level, they may be allowed to partially block a space between the main frame 215 and the ocular plate 220 as long as the immersion level is not seriously degraded even when the space is partially opened.

A fourth embodiment of the present invention will be described with reference to FIGS. 17 to 20.

Figure 17:
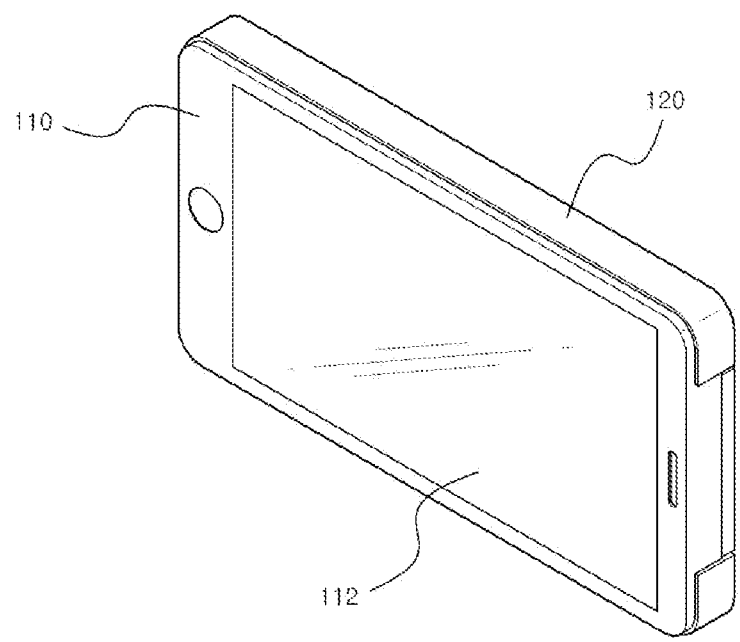
FIG. 17 is a perspective view of a virtual reality cell phone according to a fourth embodiment of the present invention.
Figure 18:
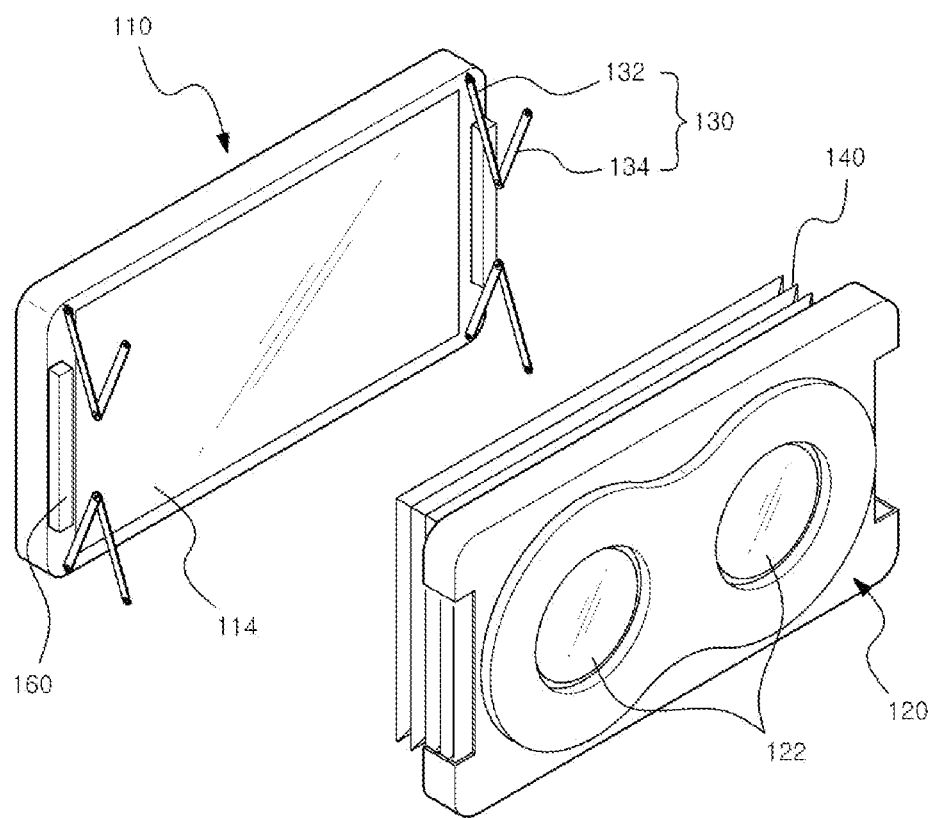
FIG. 18 is an exploded perspective view showing the virtual reality cell phone of FIG. 17 from the rear surface thereof.

FIG. 17 is a perspective view of a virtual reality cell phone according to the fourth embodiment of the present invention, and FIG. 18 is an exploded perspective view showing the virtual reality cell phone of FIG. 17 from the rear surface thereof.

Referring to FIGS. 17 and 18, the virtual reality cell phone 100 according to the present embodiment includes a main body 110, an ocular plate 120, a distance adjustment member 130, and a light blocking screen 140.

The main body 110 includes a main display 112 disposed on the front surface thereof and a virtual reality display 114 disposed on the rear surface thereof, and may perform the making of a basic call, the running of an application, etc. through the manipulation of the front main display 112 or another button, or the like. Furthermore, the back virtual reality display 114 may provide a virtual reality function to a user in conjunction with the ocular plate 120. The virtual reality display 114 may be operated through the manipulation of a user, the movement detection of the ocular plate 120, or the like.

The ocular plate 120 includes a pair of ocular lenses 122, and a user can view an image, displayed on the virtual reality display 114, via the ocular lenses 122. The ocular lenses 122 allow their focus to be adjusted through fine rotational manipulation, and also allow their lateral interval to be adjusted in accordance with the distance between the eyes. Additionally, a cushion corresponding to the shape of a face, a light blocking structure configured to additionally block light, or the like may be added around the ocular lenses 122.

A flange configured to partially cover the side surfaces of the main body 110 may be further included outside the ocular plate 120. The flange can protect internal parts, can prevent dust from entering, and enables the ocular plate 120 to solidly and firmly maintain its shape by blocking the outside.

The distance adjustment member 130 includes first links 132 and second links 134 configured such that each of the first links 132 and a corresponding one of the second links 134 are connected to each other at their inner ends. The outer ends of the first links 132 are rotatably connected to the main body 110, and the outer ends of the second links 134 are rotatably connected to the ocular plate 120.

Four combinations, each including the first link 132 and the second link 134, connect the ocular plate 120 to the four corners of the main body 110. The first links 132 and the second links 134 move the ocular plate 120 between an extended state and a retracted state while being spread in rectilinear shapes or bent in V shapes.

In the present embodiment, the light blocking screen 140 is formed in a bellows shape. Both ends of the light blocking screen 140 are fastened to the main body 110 and the ocular plate 120, respectively, and thus a substantially complete darkroom is formed. However, the light blocking screen 140 may be made of a material having excellent elasticity, rather than being formed in a bellows form. The light blocking screen 140 may be designed such that it is normally fastened to any one side and is then fastened to the other side in an extended state.

Figure 19:
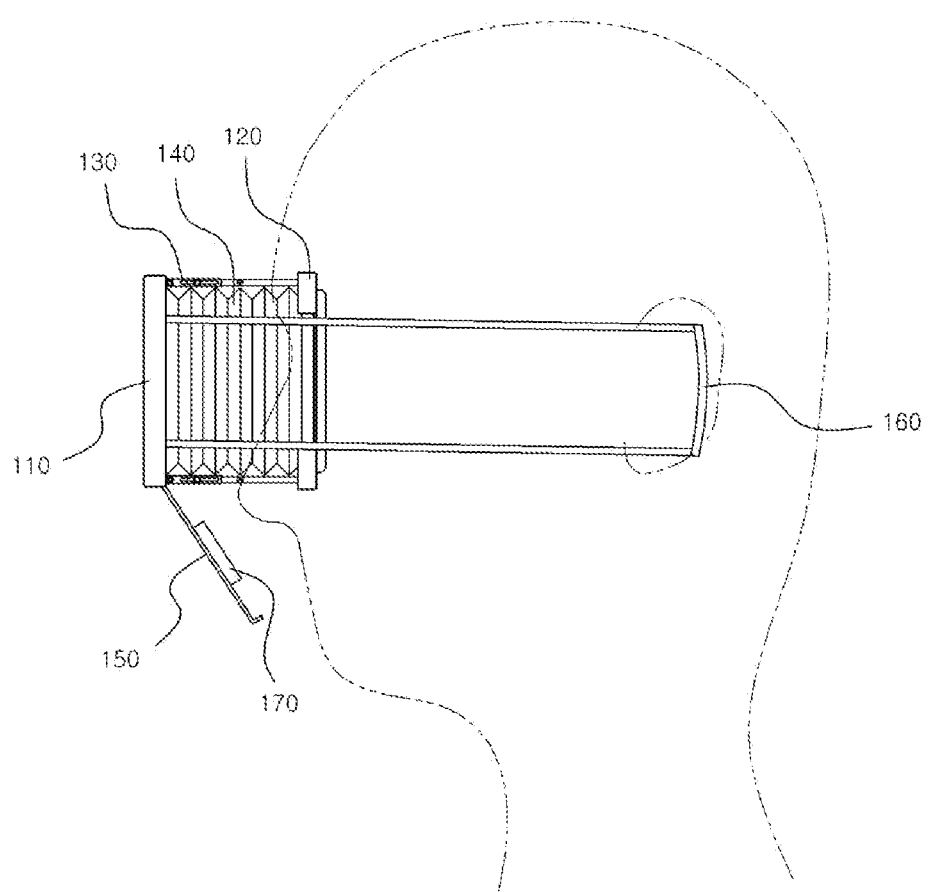
FIG. 19 is a side view of a virtual reality cell phone according to an embodiment of the present invention.

FIG. 19 is a side view of a virtual reality cell phone according to a fourth embodiment of the present invention.

Referring to FIG. 19, the virtual reality cell phone includes a main body 110, an ocular plate 120, a distance adjustment member 130, and a light blocking screen 140 like the previous embodiment, and may further include a rear cover 150.

The rear cover 150 may be used for the purpose of protecting the ocular plate 120. While a user is wearing the virtual reality cell phone, the rear cover 150 may be used in the state of drooping from the bottom surface of the main body 110 or ocular plate 120.

When the rear cover 150 is formed on the main body 110, the ocular plate 120 can not only be protected, but a smell generation unit configured to generate a specific smell in connection with the content of virtual reality or a wind generation unit 170 configured to generate a wind in connection with the content of virtual reality may be also formed additionally.

Furthermore, in order to implement a virtual reality function in a more realistic fashion, fastening members 160 configured to fasten the cell phone in its extended state to the face of a user may be further included. The fastening members 160 may be provided in the form of the earloops of a common mask. The fastening members 160 may be normally prepared on both sides of the ocular plate 120, and may be spread backward and fitted around the ears of a user for the convenience of the user.

The fastening members 160 may be provided in the form of the temples of glasses, or may be provided in the form of an elastic band that is fastened to the head of a user.

Figure 20:
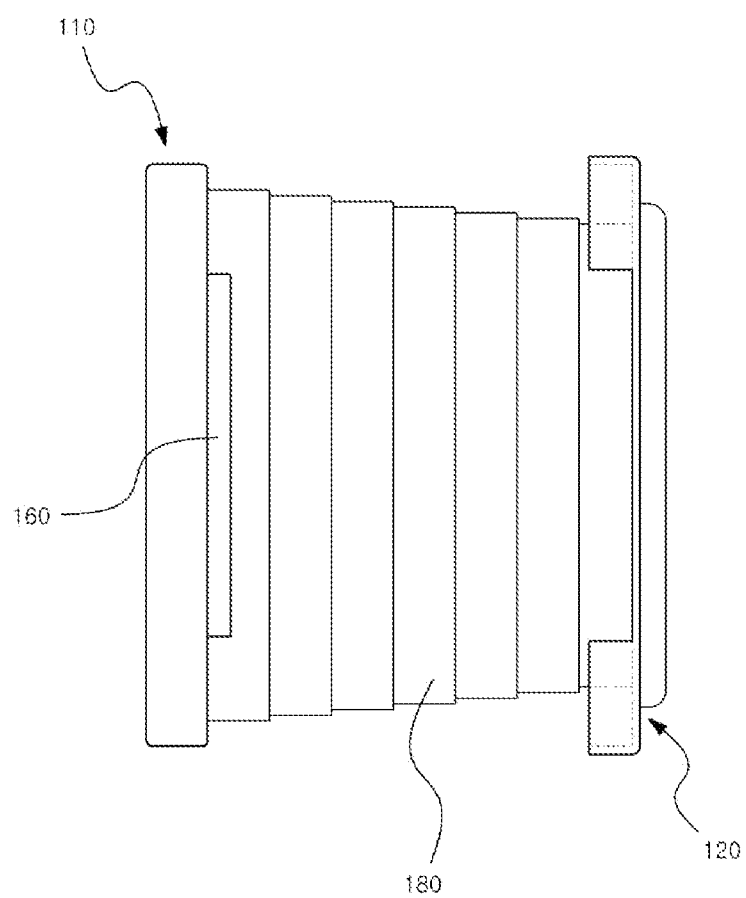
FIG. 20 is a side view illustrating a virtual reality cell phone according to another embodiment of the present invention.

FIG. 20 is a side view illustrating a virtual reality cell phone according to still another embodiment of the present invention.

Referring to FIG. 20, the virtual reality cell phone according to the present embodiment includes a main body 110, and an ocular plate 120. For detailed descriptions of these components, reference may be made to the description of the previous embodiment.

In contrast, the present embodiment includes a combined screen and distance adjustment member 180. The combined screen and distance adjustment member 180 may replace the distance adjustment member and light blocking screen of the previous embodiment. More specifically, the combined screen and distance adjustment member 180 includes a plurality of screen boxes configured to slide and be fastened in a longitudinal direction while being laid over each other. The screen boxes may be formed in rectangular shapes corresponding to the shape of the cell phone, in elliptical shapes, or in shapes each having an 8-shaped appearance conforming to the shape of the eyes.

While the foregoing description has been given with reference to the preferred embodiments of the present invention as described above, it will be understood by those skilled in the art that the present invention may be modified and altered in various manners without departing from the spirit and scope of the present invention set forth in the attached claims.

The invention claimed is:

1. A virtual reality cell phone comprising:
   a main body including a display on a front surface thereof;
   a main frame configured to accommodate the main body in an invertible manner;
   an ocular plate configured to maintain a variable distance from a rear surface of the main frame; and
   a screen and distance adjustment member interposed between the main frame and the ocular plate, and configured to move the ocular plate between in a retracted state in which the ocular plate comes into close contact with the main frame and an extended state in which the ocular plate maintains a predetermined distance from the main frame;
   wherein the screen and distance adjustment member includes a plurality of screen boxes configured to slide backward and be fixed while being laid over each other; and
   wherein when the ocular plate is in the extended state, a virtual reality function can be implemented by orienting the display of the inverted main body backward.

2. The virtual reality cell phone of claim 1, wherein the screen and distance adjustment member further includes a light blocking screen formed in a bellows shape.

3. The virtual reality cell phone of claim 1, wherein the screen and distance adjustment member accommodates all or part of side surfaces of the main body, and slides backward from the side surfaces of the main body.

4. The virtual reality cell phone of claim 1, wherein the screen and distance adjustment member includes:
   a distance adjustment member interposed between the main frame and the ocular plate and configured to move the ocular plate between the retracted state and the extended state, and a light blocking screen interposed between the main frame and the ocular plate and configured to prevent external light from entering in the extended state of the ocular plate.

* * * * *